United States Patent [19]

Rodenburgh et al.

[11] Patent Number: 6,001,296
[45] Date of Patent: Dec. 14, 1999

[54] APPARATUSES AND METHODS FOR CONTROLLING THE FILL OF TOOLING CAVITIES

[75] Inventors: Case Cornelis Rodenburgh, York; John Paul Coulter, Fogelsville; Olagunju Oladipo Oyeleye, Harrisburg, all of Pa.

[73] Assignee: The Whitaker Corporation, Wilmington, Del.

[21] Appl. No.: 08/824,943

[22] Filed: Mar. 27, 1997

[51] Int. Cl.$^6$ ...................................................... B29B 7/00
[52] U.S. Cl. .................................. 264/328.12; 264/328.8
[58] Field of Search ...................... 364/475.05, 474.17, 364/472.06, 578; 264/241, 572, 328.7, 328.8, 328.12; 425/130, 149, 533, 557, 572, 567, 449

[56] References Cited

U.S. PATENT DOCUMENTS

| | | | |
|---|---|---|---|
| 3,716,318 | 2/1973 | Erik et al. | 425/550 |
| 4,173,448 | 11/1979 | Rees et al. | 425/549 |
| 4,222,733 | 9/1980 | Gellert et al. | 425/566 |
| 4,244,909 | 1/1981 | Gellert | 264/297.2 |
| 4,268,240 | 5/1981 | Rees et al. | 425/548 |
| 4,279,582 | 7/1981 | Osuna-Diaz | 425/159 |
| 4,662,837 | 5/1987 | Anderson | 425/548 |
| 4,900,242 | 2/1990 | Maus et al. | 425/149 |
| 4,965,028 | 10/1990 | Maus et al. | 264/297.2 |
| 5,055,026 | 10/1991 | Gordon | 425/146 |
| 5,141,696 | 8/1992 | Osuna-Diaz | 264/297.2 |
| 5,149,547 | 9/1992 | Gill | 425/145 |
| 5,202,074 | 4/1993 | Schrenk et al. | 264/241 |
| 5,304,058 | 4/1994 | Gill | 425/562 |
| 5,304,341 | 4/1994 | Shah | 264/572 |
| 5,342,191 | 8/1994 | Shah et al. | 425/533 |
| 5,427,720 | 6/1995 | Kotzab | 264/40.6 |
| 5,531,581 | 7/1996 | Donnell, Jr. | 425/145 |
| 5,556,582 | 9/1996 | Kazmer | 264/40.1 |
| 5,607,640 | 3/1997 | Hendry | 264/572 |
| 5,639,405 | 6/1997 | Erikson | 264/40.3 |
| 5,645,775 | 7/1997 | Spahr et al. | 264/40.5 |
| 5,728,410 | 3/1998 | Hendry | 425/130 |

OTHER PUBLICATIONS

Injection Tooling, "Balanced Runners in a Family Mold", Dec., 1995, pp. 68–70.

Primary Examiner—William Grant
Assistant Examiner—Victoria Robinson
Attorney, Agent, or Firm—Robert Kapalka

[57] ABSTRACT

A tooling assembly (10) having complementary die sections. Die section (12) includes a face portion (14) having a tooling insert (16) mounted therein. Insert (16) includes an impression configuration (20) formed therein. Flow device assemblies (40) are in communication with impression configuration (20). Flow device assemblies (40) are variably rotatably mounted in die section (12) and are operatively connected to respective flow device actuation assemblies (60). Activation of flow device assemblies (60) can be performed manually, or automatically by, for example, respective conventional motors (90). Motors (90) may be electrical motors each with a driving mechanism attached to a respective flow control device (60). Activation of a flow device actuation assembly (60) causes a respective flow device assembly (40) to rotate and to thereby change its posture of communication with respect to impression configuration (20).

4 Claims, 8 Drawing Sheets

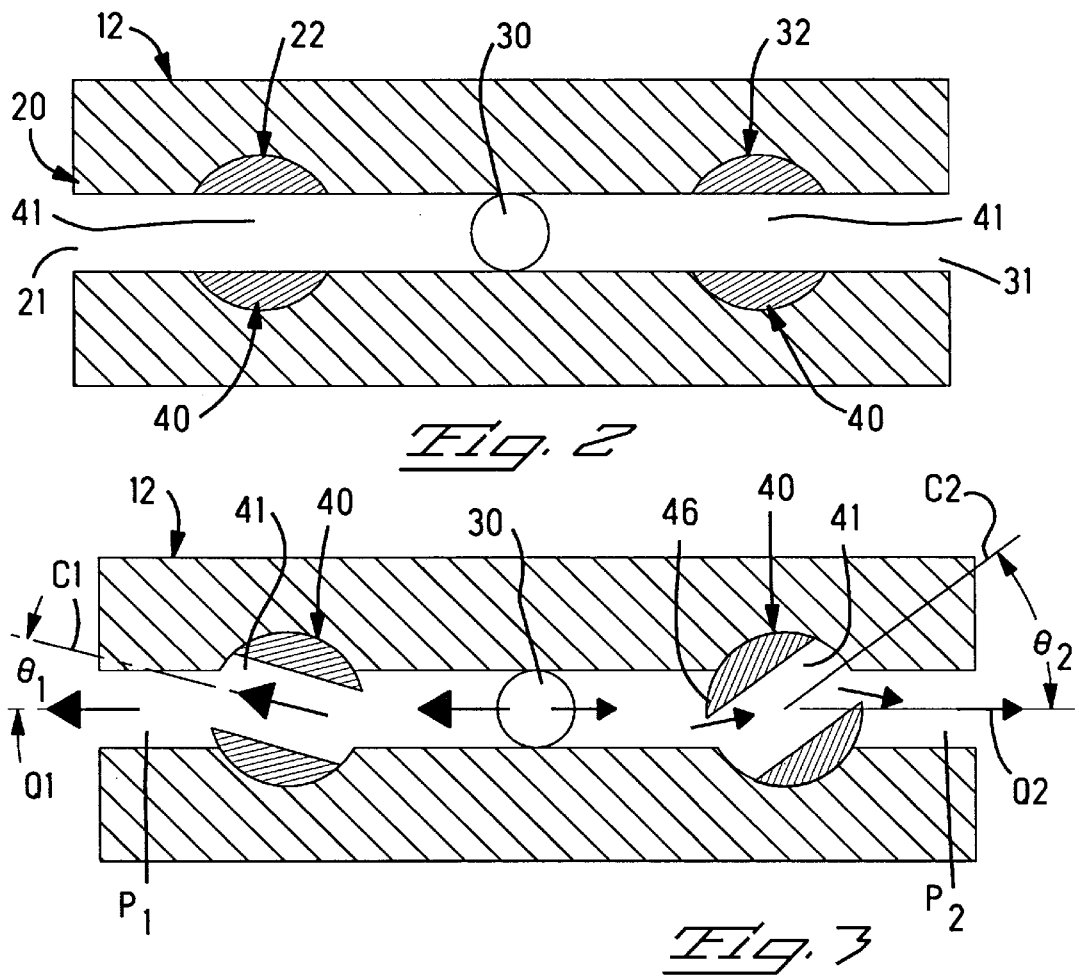
Fig. 2
Fig. 3
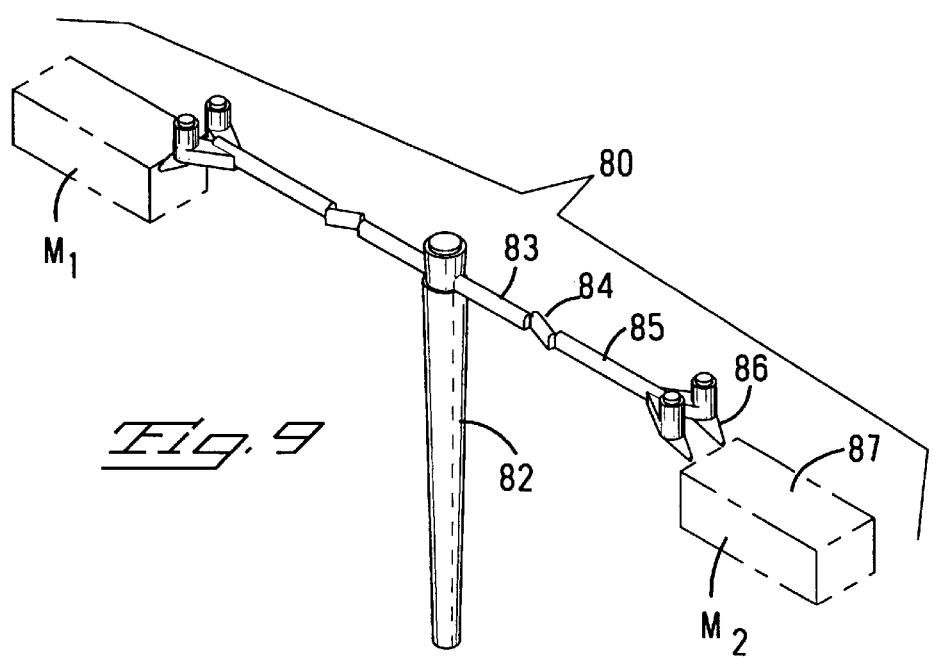
Fig. 9

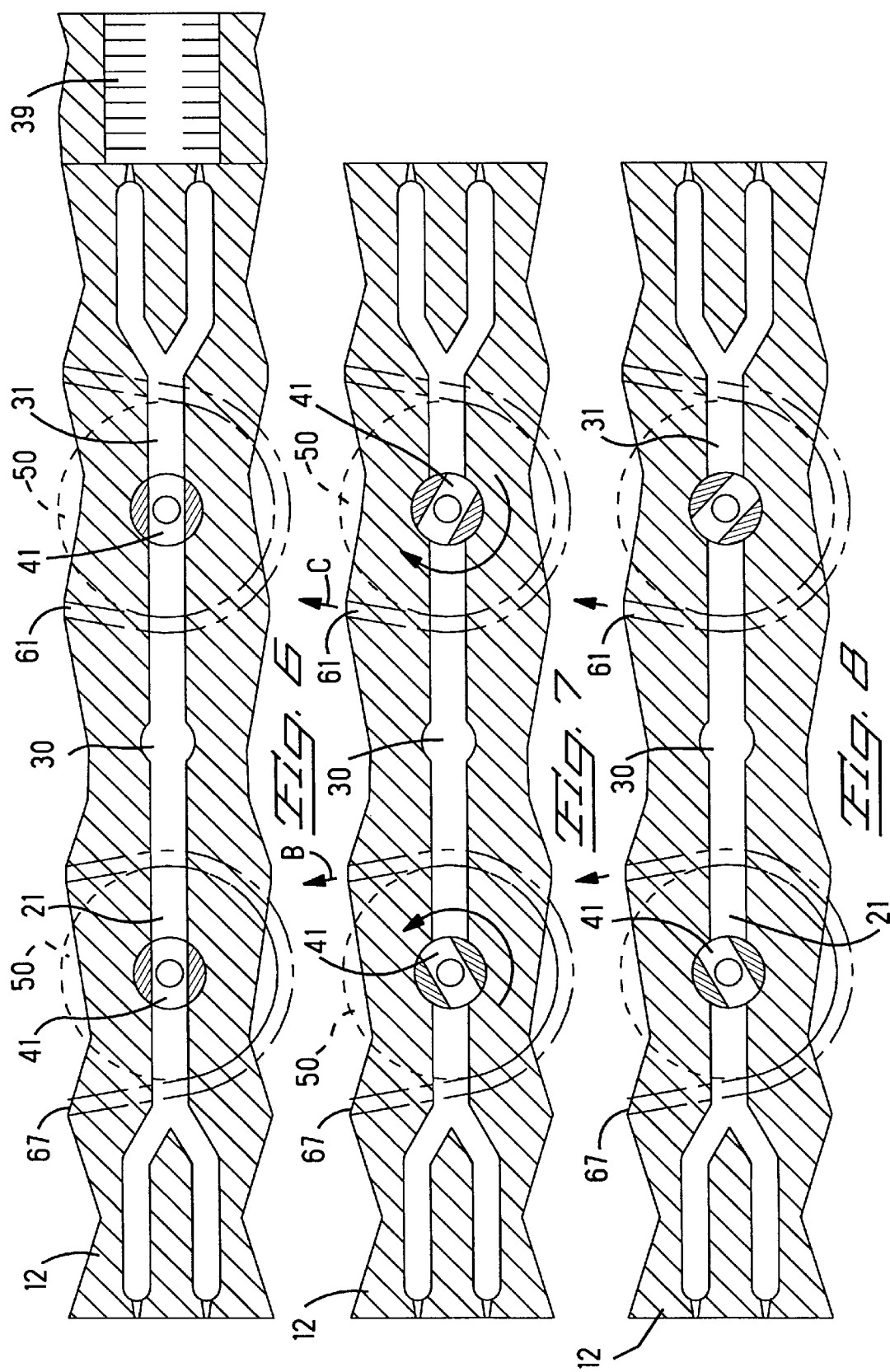

APPARATUSES AND METHODS FOR CONTROLLING THE FILL OF TOOLING CAVITIES

The present invention relates to apparatuses and methods for making articles of manufacture in injection molding or die casting processes, and, more particularly, to apparatuses and methods for modulating material flow to a cavity in injection mold tooling or a die casting die.

BACKGROUND OF THE INVENTION

Articles of manufacture can be formed of a virtually infinite number of product materials, for example: polymers, metals, ceramics, pulp, foodstuffs, or other natural or synthetic materials. Solidifiable product materials which are susceptible of being transported in a manufacturing process in a liquid, molten, or semi-solid form are conventionally shaped in injection molding or die casting operations. Such shaped articles comprise polymer, metal, ceramic, pulp, and food products for consumer, commercial, or industrial needs. To meet these product needs, manufacturers have developed injection molding molds and die casting dies which commonly contain multiple product cavities, i.e. multi-impression or family molds. Multi-impression tooling is used to produce a plurality of essentially the same products in a single shot. On the other hand, family mold tooling is used to produce different products in the same shot. Both multi-impression and family systems are formed in tooling whereby a product material flowing into the tool in a liquid, molten, or semi-solid state can be directed through a series of channels into many cavities at once, rather than only one cavity at a time. Multi-impression and family tools, therefore, allow for many products to be made in a single shot, which lowers the cost to produce the products. Moreover, the use of such tools lowers the cost of the tools themselves because less tools are needed overall to produce a given amount of product in a fixed amount of time. Where the cost of producing products is thereby lowered, consumers and industry may see a benefit in the form of lower market prices of such products.

There is, however, a problem with multi-impression and family mold tools regarding the mold filling. All cavities in a given tooling may not be made equal, i.e. there may be volumetric or geometric differences between cavities which will affect the rate at which a cavity can be filled. During the filling process, the volumetric flow rate of the product material entering an easier-to-fill cavity will be higher because the product material will naturally take the path of least resistance. Thus the easier-to-fill cavity can experience over-packing, i.e. too much product material. On the other hand, a harder-to-fill cavity may experience short shots, i.e. the product cavity was not fully filled. When these problems occur, the multi-impression or family tooling may be said to be out of balance. This means that the product material is not flowing in a balanced way to each cavity in the multi-impression or family tooling. A balanced tooling is one where each cavity in the multi-impression or family tooling is conditioned to receive a sufficient mass of product material so that both short shots and over-packing are avoided.

Conventional tooling provides channel shut-off flow valves located in the channels where the product material must flow. Channel shut-off flow valves have two modes of operation, namely, non-variable "on" and "off" modes. Channel shut-off flow valves do not otherwise modulate the material flow or vary product material conditions such as pressure, mass flow rate, or volumetric flow rate. Such channel shut-off flow valves, when in the off mode, block any and all flow to a product cavity. When in the on mode, such shut-off flow valves are fixed in a non-variable, open position. Such a shut-off flow valve is disclosed in U.S. Pat. No. 4,909,725.

Tooling has been developed to attempt to control product material flow to cavities for the purpose of balancing a family mold tool. An article appearing on pages 68–70 of the December, 1995, issue of *INJECTION TOOLING* magazine entitled: "*Balanced Runners in a Family Mold*" describes such tooling. The tooling described therein uses gate openings and "channels", i.e. runners, to define a specialized runner/gate system. The runner/gate system comprises runners and gates of various sizes or shapes for the purpose of controlling the filling of a product cavity. Theoretically, smaller gate openings and runners will increase resistance to the flow of the product material to a product cavity at the end of the runner. The relatively smaller gate openings and runners are formed in the family mold tooling such that they lead to a relatively easier-to-fill cavity. In this way, during a shot of product material, the mass or volumetric flow rate is relatively slowed to the easier-to-fill cavity. Consequently, during the same shot, the product material is forced to go toward the harder-to-fill cavity so that it fills up. According to the foregoing, filling of cavities may be controlled, and the family mold tooling may thereby be balanced, by fixing the sizes and shapes of the runner/gate system.

However, in order for the gate openings and runners to be properly sized and shaped, engineers must utilize a computer program so that mathematical calculations can be performed which will define the parameters of the runner/gate system. Once the calculations are believed to be correct, engineering drawings are prepared, and the drawings are used by machinists to make tooling in a tooling shop. At the shop, the runners and gates are permanently cut into the steel of the tooling to define the runner/gate system. The tooling is then put through a start-up conditioning cycle for a given product material, i.e. the tooling is fine tuned, and is then put to the test in the factory. If the runner/gate system, when in actual use in the factory, does not result in acceptable product quality, the tooling must be scrapped or sent back to the shop for further work. Moreover, if a different product material is used in the family mold tooling, the material may have physical characteristics which require another conditioning cycle. This is a time consuming and expensive procedure which may result in lost manufacturing time and higher tooling costs. Consequently, the manufacturer's product costs may rise and consumers may pay higher market prices for the products they need.

In light of the foregoing, what is needed is tooling having a means of controlling the filling of a product cavity, which is suitable for use in either a multi-impression or family tooling application, but which keeps production and tooling costs to a minimum.

OBJECTS AND SUMMARY OF THE INVENTION

It is an object of the present invention to provide an apparatus and method for controlling the filling of a product cavity in multi-impression or family tooling which keeps production and tooling costs to a minimum.

It is another object of the present invention to variably control the pressure, volumetric, and/or mass flow rate conditions of product material in injection tooling or die casting tooling.

It is another object of the present invention to provide manual and automatic methods of controlling the conditions which affect the filling of a product cavity.

It is an object of the present invention to provide an apparatus and method for variably controlling the filling of a product cavity in tooling which provides simultaneous control of the filling of all cavities in multi-impression or family tooling.

It is an object of the present invention to provide an apparatus and method for variably controlling the filling of a product cavity at the tooling level by way of an intelligent control system.

It is another object of the present invention to provide a flow channel located in tooling which is operative to variably control the filling of a product cavity in the tooling but which avoids product material degradation clue to a shear heating effect.

It is another object of the present invention to provide manual and automatic methods of variably controlling the flow channel, by rotation or linear actuation of thereof, and to thereby control the filling of a product cavity.

It is another object of the present invention to provide a flow channel located in tooling which is operative to modulate the filling of a product cavity from full open to full closed positions of the flow channel.

It is an object of the present invention to provide an apparatus and method for variably controlling the filling of a product cavity in tooling which is suitable for use with a natural or synthetic product material in a liquid, molten, or semi-solid state.

It is another object of the present invention to provide an apparatus and method for variably controlling the filling of a product cavity which is useful in conditioning multi-impression or family mold and thereby avoiding scrap.

The present invention comprises a tooling assembly comprising: a product material inlet; a product material channel in communication with the product material inlet; a product cavity in communication with the product material channel; the product material inlet, channel, and product cavity define a flow path for a product material to flow therein; a flow device assembly, a portion of the flow device assembly is in communication with the flow path; a flow device actuation assembly, the flow device actuation assembly is operatively associated with the flow device assembly, operation of the flow device actuation assembly controls the portion of the flow device assembly which is in communication with the flow path, the flow device actuation assembly is thereby operative to alter the posture of said portion with respect to the channel; whereby as product material flows in the flow path from the inlet to the product cavity, the flow device actuation assembly is operative to control the pressure, volumetric, and/or mass flow rate conditions of the product material filling the product cavity.

The present invention also comprises a process for making a part comprising a solidifiable product material, comprising: flowing the product material in a flow path; providing a flow channel comprising a portion of the flow path, the flow channel being adjacent to other portions of the flow path; altering the posture of the flow channel with respect to the adjacent portions of the flow path so that said flow channel is offset from said adjacent portions of the flow path; allowing said product material to solidify in said flow channel and adjacent portions of the flow path whereby said part is formed with an impression of said flow channel and said adjacent portions of said flow path; and said flow channel solidified material being offset with respect to said adjacent flow path portions' solidified material.

Additionally, the present invention comprises a method of conditioning tooling having product cavities, comprising the steps of: setting flow channels of the tooling to initial positions; injecting product material into the tooling; inspecting the parts for quality; and adjusting the posture of the flow channels to effect product material conditions thereby avoiding short shots or over-packing. Where the product comprises a short shot to a product cavity, a flow channel adjustment is made permitting increased flow of product material to the product cavity. Where over-packing of a product cavity occurs, a flow channel adjustment is made for increased resistance to product material flow to the cavity. The adjustments made effect pressure, volumetric or mass flow rates of the product material. The adjustments are made manually or the adjustments are made by a supervisory process controller.

The present invention also provides an intelligent control system loop for controlling fill of product cavities, comprising: a supervisory process controller having a given set of product requirements programmed therein; and the controller sends a control signal to a tooling controller, the tooling controller compels tooling adjustments to be made in a flow device, the tooling adjustments comprising an adjustment posture of flow channels of the tooling via a flow device actuation assembly. Additionally, the controller sends a control signal to a manufacturing equipment controller to compel manufacturing equipment adjustments to be made to effect the pressure and temperature of the product material. Also, a plant performs product manufacture of a part in the tooling and simultaneous process monitoring takes place. The process monitoring data is fed back to the controller after analysis by an intelligent process evaluation comprising a process comparator function.

BRIEF DESCRIPTION OF THE DRAWINGS

FIG. 2 shows a detail drawing of a portion of the tooling assembly of FIG. 1.

FIG. 3 shows a detail drawing of a portion of the tooling assembly of FIG. 1.

FIG. 6 shows a detail drawing of the tooling assembly of FIG. 1.

FIG. 7 shows a detail drawing of the tooling assembly of FIG. 1.

FIG. 8 shows a detail drawing of the tooling assembly of FIG. 1.

FIG. 9 shows a part made by the apparatus and method according to the present invention.

DETAILED DESCRIPTION OF THE INVENTION

Figure 1:
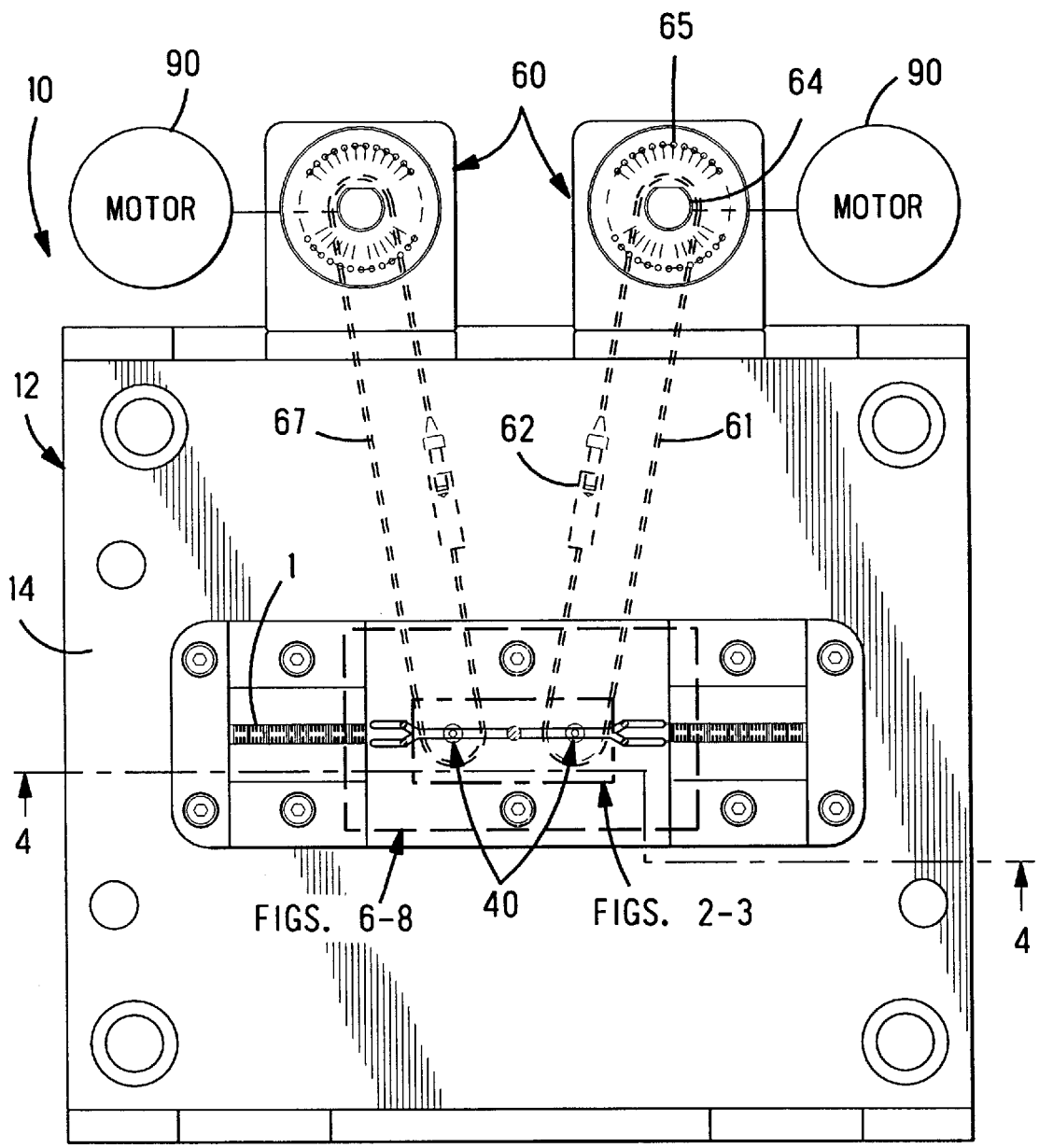
FIG. 1 shows an elevational view of a tooling assembly according to the present invention.
Figure 4:
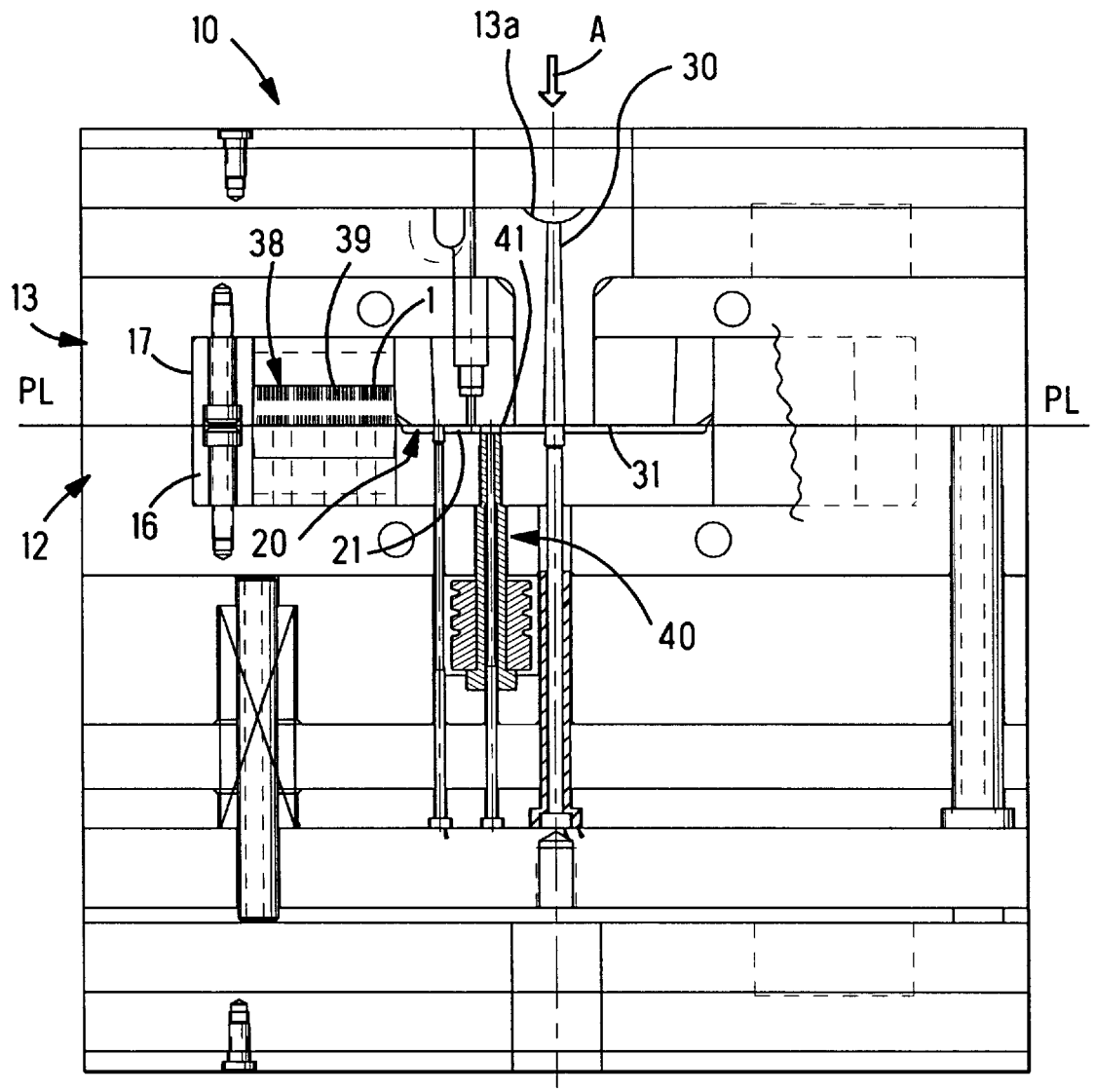
FIG. 4 shows a partial cross sectional view of the tooling assembly of FIG. 1 taken along line 4—4.
Figure 5:
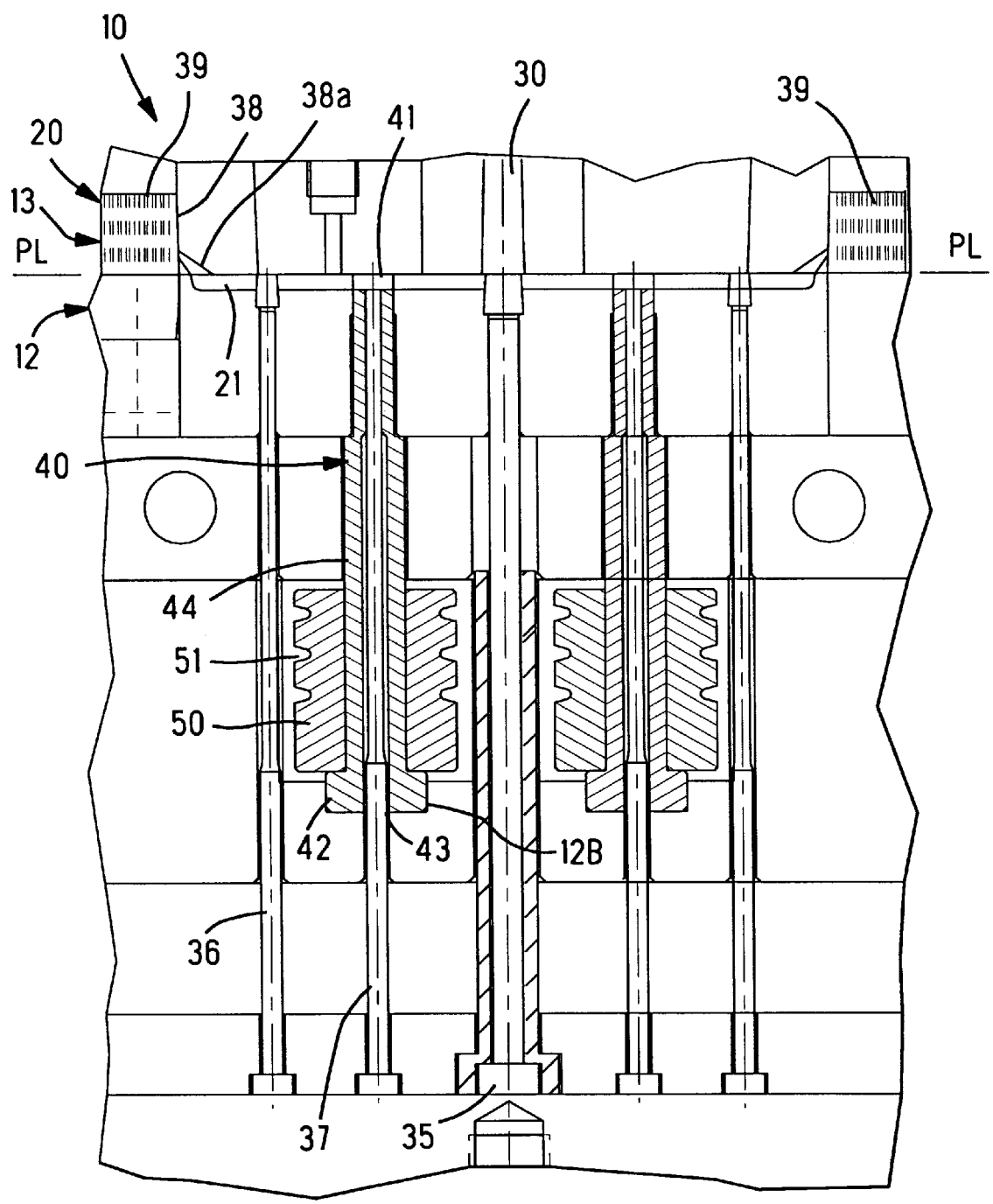
FIG. 5 shows a cross sectional view of the tooling assembly of FIG. 1.

Referring to FIG. 1, a tooling assembly 10 according to an embodiment of the present invention will be described. Tooling assembly 10 comprises complementary mold half sections 12 and 13 (FIGS. 4–5). Mold section 12 includes a face portion 14 having a tooling insert 16 (FIG. 4) mounted therein. Insert 16 includes an impression configuration 20 formed therein. Flow device assemblies 40 are in communication with impression configuration 20. In a preferred embodiment of the present invention, flow device assemblies 40 are variably rotatably mounted in mold half section 12 and are operatively connected to respective flow device actuation assemblies 60. Activation of flow device assemblies 60 can be performed manually, or automatically by, for example, respective conventional motors 90. Motors 90 may be electrical motors each with a driving mechanism attached to a respective flow control device 60. Activation of a flow device actuation assembly 60 causes a respective flow device assembly 40 to rotate and thereby change its posture of communication with respect to impression configuration 20.

Referring to FIGS. 2–3, mold half section 12 will be further described. Tooling impression 20 includes product material channels, for example, preferably trapezoidal runners 21,31 in communication with a product material inlet, for example, a sprue channel 30. Die section 12 has bores 22,32 which receive portions of respective flow control device assemblies 40. Located in runners 21,31 are flow channels 41 of respective flow device assemblies 40. Channels 41 can be aligned with runners 21,31 (FIG. 2), and either or both channels 41 may be angularly offset with respect to runners 21,31 (FIG. 3).

As best shown in FIG. 4, tooling assembly 10 comprises a parting line PL when die sections 12,13 are in facing contact. Die section 13 includes a product material receiving area, for example, a mold sprue bushing 13a. Additionally, die section 13 includes a tooling insert 17 mounted therein. Insert 17 includes an impression configuration 38 including a preferably tapered gate section 38a (FIG. 5) and a partial product cavity 39. Product cavity 39 defines a complete product cavity when die sections 12,13 are in facing contact (FIG. 4)

As best shown in FIG. 5, flow channels 41 are substantially similar and comprise part of an end section of a respective flow channel member, for example, pins 44 which are rotatably mounted in die section 12. Each pin 44 may comprise a head 42, a through bore 43, and valve sections 46 adjacent flow channels 41 (FIG. 3). Attached to each pin 44 is a flow device pulley 50 which comprises cable receiving grooves 51 formed therein. Heads 42 are rotatably seated in a respective recess 12b of die section 12. Heads 42 serve to maintain the position of respective flow device pulleys 50. Mold section 12 further includes ejector pins 35,36,37 for ejecting a part. Ejector pin 37 is disposed in bore 43 of pin 44. Preferably, where two pins 44 are provided in a tooling assembly, as in the present illustration, they may be interchangeable.

As best shown in FIG. 1, flow device actuation assemblies 60 include respective cables 61,67 which are attached to respective device pulleys 50 and to respective index pulleys 64. Each cable comprises a respective turn-buckle fitting 62 for tensioning thereof. Flow device actuation assemblies 60 further comprise detent mechanisms 65 with indicia marks 66 comprising angular gradations, for example, in 5 degree increments. The angular range in the present embodiment is about +60 degrees (fully closed) to about −60 degrees (fully closed) where 0 degrees is the fully open position. As skilled artisans will appreciate, the angular range depends on the geometry of the flow channel being used. Preferred flow channel geometries comprise a reduced port flow channel having a cross sectional area equal to about 65% to 85% of the runner size.

Operation of flow device assembly 40 will now be described. FIG. 6 shows an initial condition whereby flow channels 41 are aligned with runners 21,31. However, upon manual or automatic activation of a respective index pulley 64 to a desired angular gradation, the respective cable 61,67 will be moved. Cables 61,67 can be moved in the direction of arrow B or arrow C of FIG. 7. Movement of either cable 61,67 will cause rotation of the respective device pulley 50 to which it is attached via groove 51. Rotation of either device pulley 50 will cause the pin 44 it is associated with to rotate accordingly, which causes the respective flow channel 41 to rotate, thereby changing the communication posture of the flow channel 41 with respect to its respective runner 21,31 (FIG. 7). To illustrate, activation of cable 67 in the direction of arrow B causes flow channel 41 to rotate in a counterclockwise direction as shown in FIG. 7. Activation of cable 61 in the direction of arrow C causes rotation of flow channel 41 to rotate in a clockwise direction (FIG. 7). Preferably both flow channels 41 are moveable in either a clockwise or counterclockwise direction in response to changes in the angular setting of the respective flow device actuation assembly 60. Continued rotation of flow channels 41 will eventually completely close-off runners 21,31 (FIG. 8).

Operation of tooling assembly 10 in the context of an injection mold tooling application will now be described; however, it will be understood by those of ordinary skill in the art that the present invention can be used in a. die casting application as well and still be within the scope of the appended claims. An injection mold tooling application for use with the present invention may use any natural or synthetic product material comprising polymers, metals, ceramics, pulp, foodstuffs, or any other natural or synthetic material or combination thereof. To illustrate the present invention, an injection mold tooling application using a polymer product material will be described.

Referring to the foregoing Figures, it is seen that a product material flow path begins at mold sprue bushing 13a (FIG. 4) where a press nozzle (not shown) would inject molten polymer material into tooling assembly 10. The polymer would flow under high pressure into sprue 30, and the product material would be forced into runner sections 21,31, as shown in FIG. 3. The material would be split into generally opposing flow paths, each path initially following the generally straight path adjacent to sprue 30, i.e. along a line indicated as CR (FIG. 3), the center of runners 21,31. The flow paths would traverse a portion of the flow device assembly 40 which is in communication with the flow path, i.e. flow channels 41, and enter into respective gates 38a (FIG. 5) and into respective product cavities 39. Flow channels 41 are operative to alter the flow path but not necessarily shut it off completely unless desired. In the present illustration, two product cavities 39 are shown on opposing sides of sprue 30 so that preferably two products are made simultaneously. For example, the product cavities comprise the characteristics of an electrical connector housing product.

Each flow channel 41 is characterized by a communication posture with respect to runners 21,31. The posture is preferably in terms of variable angles $\theta_1$, $\theta_2$ which are defined with respect to CR and lines $C_1$, $C_2$, i.e. the extended approximate centers of flow channels 41 (FIG. 3). Vectors $Q_1$, $Q_2$ indicate mass or volumetric flow rate conditions of the flow path. Preferably pressure sensors $P_1$, $P_2$ may be located in runners 21,31 and/or cavities 39, respectively, downstream of flow channels 41 for sensing the respective pressure conditions of the flow path.

In operation of the present invention, the magnitudes of $\theta_1$, $\theta_2$ will be varied by manual or automatic actuation of flow device actuation assembly 60. In general, for example, as $\theta_2$ is increased, resistance to the flow of product material is controlled in the material flow path, in this case increased, because runner 31 is being blocked by valving section 46. Consequently, the pressure condition at $P_2$ will drop, and the $Q_2$ mass or volumetric flow rate conditions will be modulated to a lower magnitude. Where $\theta_1$ is less than $\theta_2$, the resistance to the flow of material will generally be less in the direction of the left hand side cavity as shown in FIGS. 1 and 4, i.e. product cavity 1, and in general, the product material will preferentially flow toward the product cavity 1 flow channel, i.e. the material will naturally tend to flow toward the path of least resistance. Consequently, the material pressure condition at $P_1$ will be greater than the material pressure condition at $P_2$, and the $Q_1$ volumetric or mass flow rate condition will be greater than the $Q_2$ volumetric or mass flow rate conditions. Varying the posture of flow channels 41, therefore, alters the pressure, volumetric, and mass flow rate conditions in one or both of the opposing product cavities 39 at the time of fill. The fill of the product cavities is thereby controllable.

A result is that each flow channel 41 can be conditioned, i.e. fine tuned, to be set at an angle $\theta$ whereby each product cavity 39 is simultaneously filled with product material according to its need, thereby avoiding short shots or over-packing. Balancing of the product material flow is achieved by properly setting $\theta_1$, $\theta_2$ to desired angles to assure that multiple products with optimal properties are made in the same tooling at the same time. This conditioning can be done as a start-up conditioning procedure for new tooling, or a conditioning procedure for a different batch of product material. The process of conditioning a multi-impression or family mold using the present invention comprises the steps of: setting flow channels of the tooling to initial positions; injecting product material into the tooling; inspecting the products for quality; and adjusting the posture of the flow channels to affect product material conditions thereby avoiding short shots or over-packing. Short shots would require a flow channel adjustment permitting increased flow of product material. On the other hand, over-packing would require a flow channel adjustment for increased resistance to product material flow. The adjustment made would affect changes in pressure, volumetric or mass flow rates to the desired degree. It is important to note, however, that the adjustments can be made manually or by activation of either or both motor 90. Moreover, such adjustments can be made in infinite increments of 0.5 to 5 degrees, as required by the particular application.

When the filling process is completed, a final part 80 (FIG. 9) is made and is ejected from tooling assembly 10 by ejector pins 35–37. Part 80 is, in the present illustration, formed of a polymer material and includes a sprue 82 leading to runner portions 83. A flow channel material solidification section 84 is geometrically offset from portion 83 on one side, and section 84 is geometrically offset from an adjacent runner portion 85 on another side. Flow channel 41 is shaped to permit removal of solidified material therefrom during ejection of part 80. Runner section 85 leads to gate section 86, and gate section 86 to product 87. In the present illustration, product 87 comprises an electrical connector housing. Products 87 may comprise multi-impression tooling products of essentially equal volumes or masses, or family tooling products of unequal volumes or masses, as indicated in FIG. 9 at M1,M2. As noted above, varying the posture of flow channels 41 alters the product material conditions in the product cavities 39 at the time of fill, and controls the fill to form products of equal or unequal volumes or masses. The product material is modulated by flow device assemblies 40 so that each product 87 is a complete, high quality product.

Figure 10:
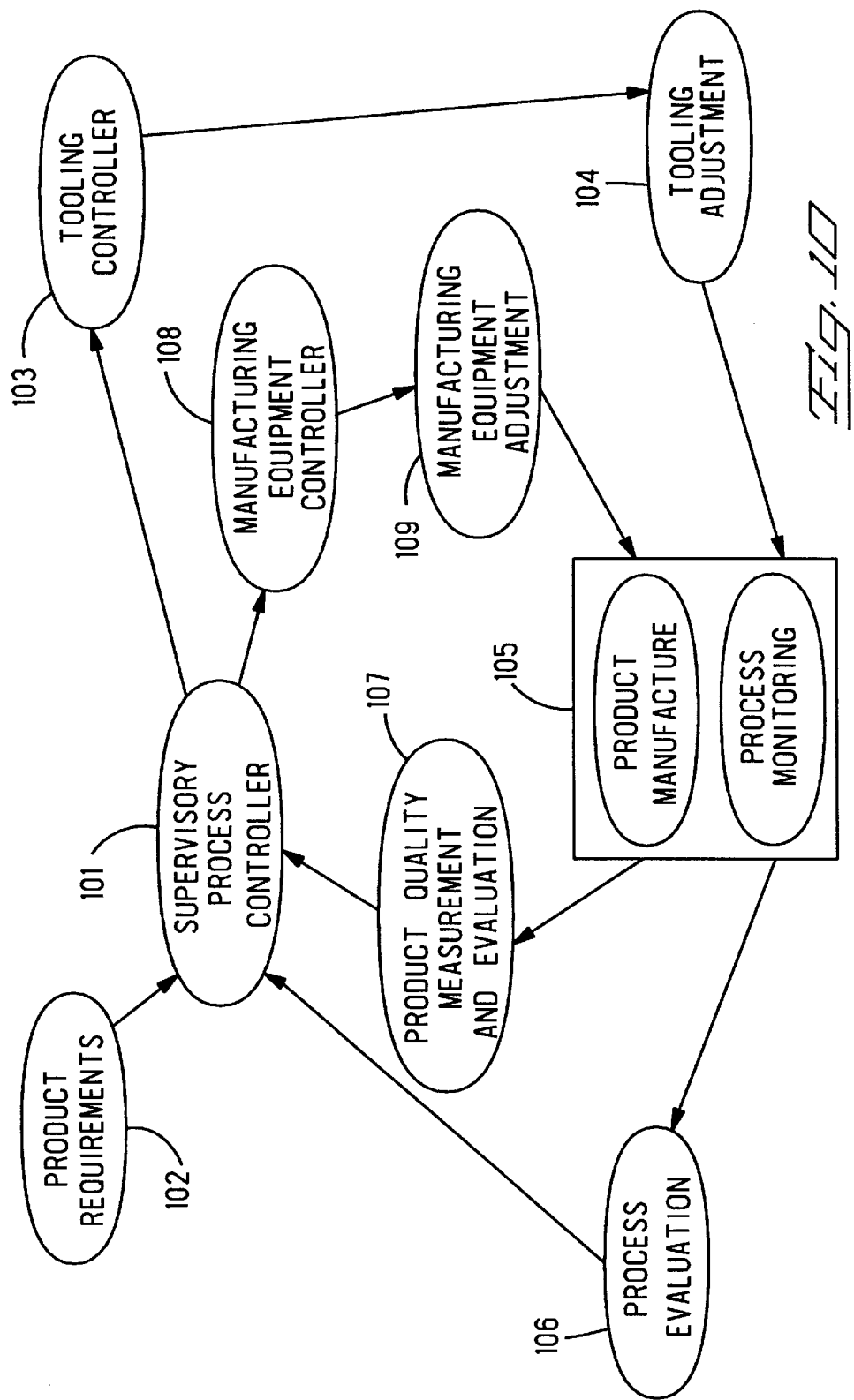
FIG. 10 shows a diagram of an intelligent control system loop for use with the present invention.

In addition to manual or automatic control, flow device actuation assembly 60 is adaptable to fully intelligent process control as well. FIG. 10 shows a control system loop 100 comprising a supervisory process controller 101. The intelligent control process would include a given set of product requirements 102 programmed into controller 101. Controller 101 would send a control signal to a tooling controller 103 which would compel tooling adjustments 104, e.g. the posture of flow channels 41 via flow device actuation assembly 60 and motors 90, to be made. Controller 101 would also send a control signal to manufacturing equipment controller 108 to compel manufacturing equipment adjustments 109, e.g. pressure and temperature of the product material from a press nozzle, to be made. At this point, plant 105 would then perform manufacture of a product and simultaneous process monitoring would take place. Process monitoring data would be fed back to a controller 101 after analysis by an intelligent process evaluation 106, for example, by a process comparator function. Also, product quality and measurement data 107 would be fed back to controller 101. Thus the feed back loop would be closed, and controller 101 would then maintain or modify the manufacturing equipment and tooling adjustments in accordance with the data supplied in the feedback loop. The manufacturing cycle would then be repeated.

Although a preferred embodiment of the invention has been described, the description thereof is intended for illustrative purposes. Various changes can be made to the foregoing embodiment without departing from the scope of the appended claims.

For example, although the foregoing embodiment shows a flow channel 41 which is substantially as wide as the runner 21 or 31 to which it pertains, i.e. a full port channel, the width of the flow channel can be made broader or narrower (e.g. a reduced port) than the runner width depending on desired product material flow characteristics. The size of the channel may be some function or % of the size of the runner to which it pertains.

Additionally, the shape of flow channels 41 can be modified into a V shape for improved resolution of flow channel adjustment, or a rectangular, a semicircular, or other cross sectional shape may be used as well.

Figure 11:
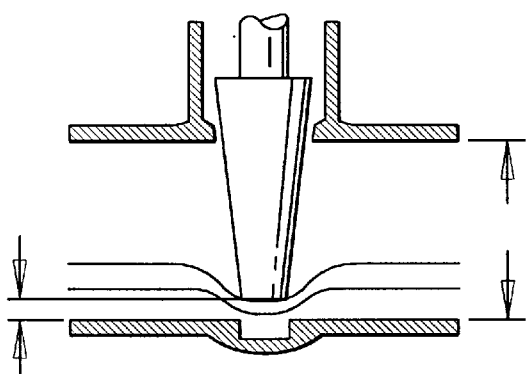
FIG. 11 shows a gate flow channel for use with the present invention.
Figure 14:
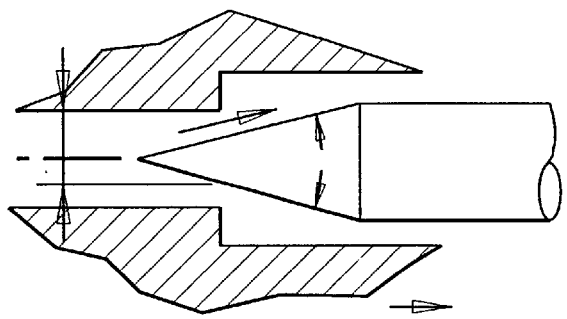
FIG. 14 shows a needle flow channel for use with the present invention.
Figure 12:
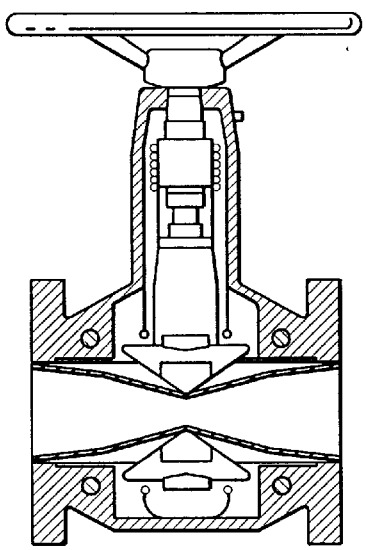
FIG. 12 shows a pinch flow channel for use with the present invention.
Figure 15:
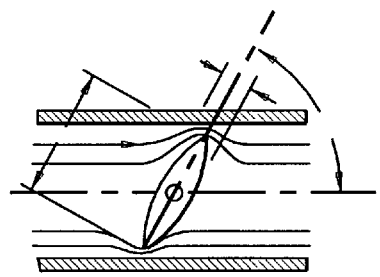
FIG. 15 shows a butterfly flow channel for use with the invention.
Figure 13:
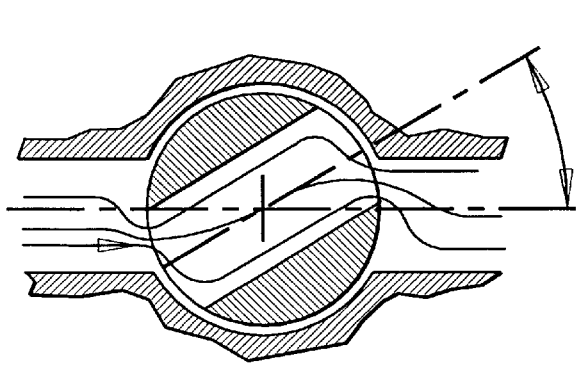
FIG. 13 shows a plug flow channel for use with the present invention.
Figure 16:
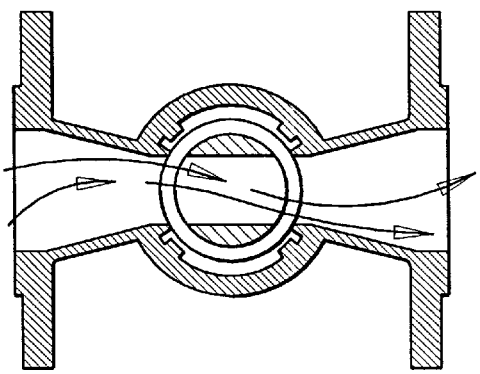
FIG. 16 shows a caged rotary plug flow channel for use with the present invention.

Moreover, the preferred shape of flow channel 41 is similar in performance characteristics to that of a rotary plug flow channel, as shown in FIG. 13. However, other flow channels, comprising either rotary or linear action or a combination thereof, may be used as well, depending on desired performance characteristics. For example, such flow channels as: a rotary or linear gate flow channel (FIG. 11); a pinch flow channel (FIG. 12); a needle flow channel (FIG. 14); a butterfly flow channel (FIG. 15); or a caged rotary plug flow channel (FIG. 16). The skilled artisan will appreciate that the scope of the appended claims includes at least all of the foregoing flow channel types.

Figure 17:
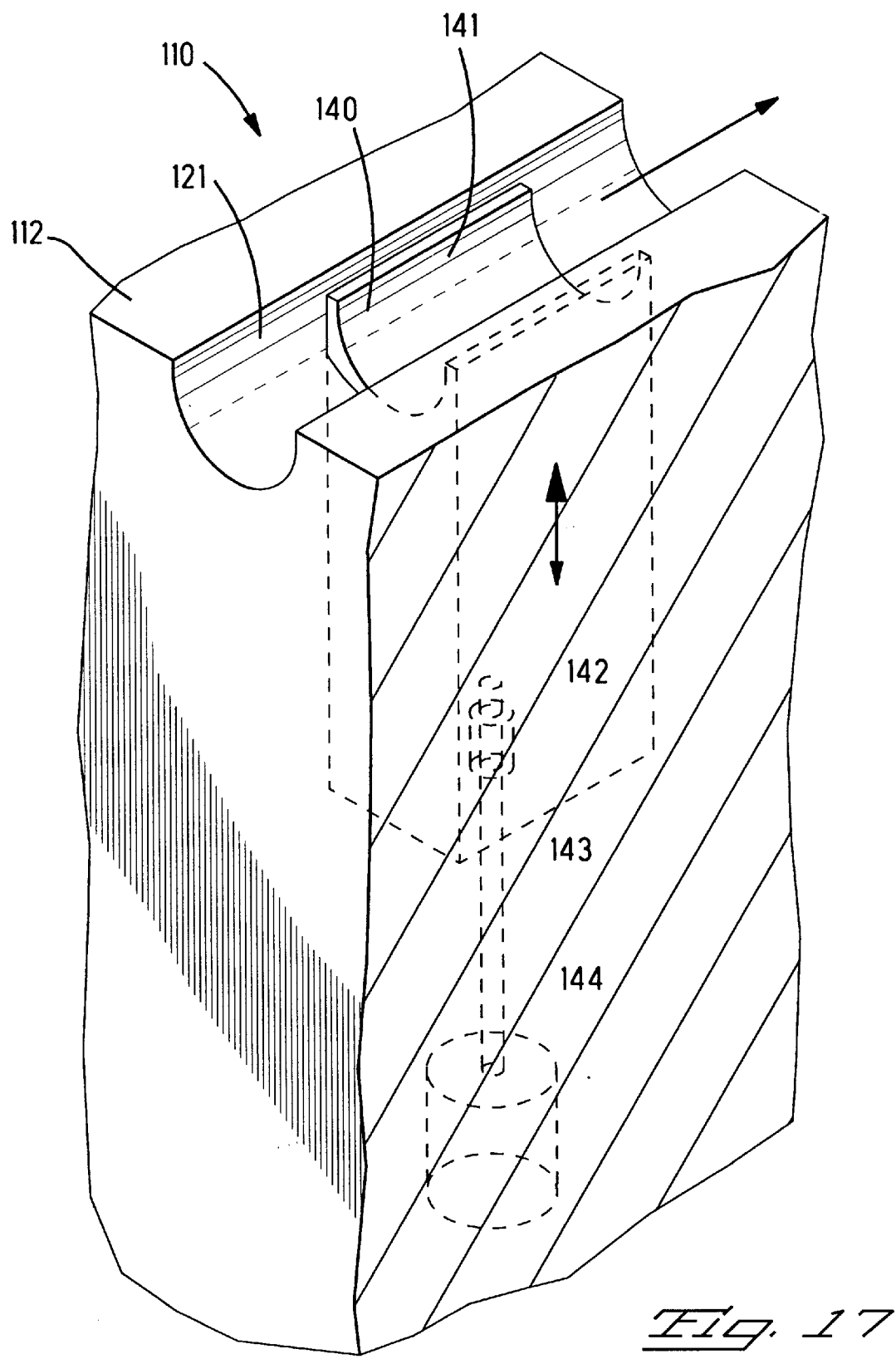
FIG. 17 shows a second embodiment flow device assembly and control therefor according to the present invention.

Furthermore, a linearly actuated flow channel configuration 110 such as shown in FIG. 17 can be used with efficacy. Flow channel 110 comprises a flow channel piece 140 slidably mounted in a mold section 112. Mold section 112 is intended for use with a complementary mold section (not shown) for defining a closed tooling channel. Flow channel piece 110 has a flow channel 141 formed therein for modulating the flow of a runner 121. Flow channel piece 140 includes a threaded member 142 which cooperates with a rotatable threaded shaft 143 which is connected to a conventional servo-motor 144. Activation of servo-motor 144 causes shaft 143 to be rotated, which causes flow channel piece 140 to be shifted with respect to runner 121. The flow of product material across flow channel 141 is thereby modulated. An angular or linear gradation may be used to indicate the position of flow channel piece 140.

Also, although substantially similar flow channels 41 have been described for use in the same tooling assembly 10, to the extent that pins 44 are interchangeable; nevertheless, the skilled artisan will understand that it is within the scope of the claimed invention to have flow channels 41 of different shapes used in the same tooling assembly 10.

Additionally, although flow channels 41 are shown generally medially disposed between gates 38a and sprue channel 30 for the purpose of reducing wear on the flow channel, the skilled artisan will understand that the scope of the appended claims includes flow channels located to one side or the other of the location shown in the forgoing embodiment. The skilled artisan will therefore appreciate that the scope of the appended claims includes locations of a given flow channel in or adjacent to gates 38a or adjoining or in sprue channel 30.

Further, although the preferred embodiment describes a polymer injection molding process, it will be understood by skilled artisans that the scope of the accompanying claims includes metal and ceramic injection molding processes as well.

Although the forgoing embodiment describes a balancing of the tooling by properly setting angles $\theta_1$, $\theta_2$ of two flow channels, it will be understood by those of ordinary skill in the art that the present invention can be used with any number of cavities 1 . . . n each having a respective variable flow channel 1 . . . n. Each flow channel comprising a range of angles as a function of flow channel settings $\theta_1$ . . . $\theta_n$. Moreover, although increments of 5 degrees have been described, an infinite number of gradations can be used as well without departing from the scope of the appended claims.

Furthermore, although ejector pins 37 are disposed in respective bores 43 of pins 44, the skilled artisan will appreciate that the scope of the appended claims covers pins 44 without such ejector pins 37. It is also possible to combine heating to runners 21,31 to define a hot runner system in combination with flow channel 41 of the present invention.

Accordingly, what is claimed is:

1. A tooling assembly comprising:
   (a) a product material inlet;
   (b) a product material channel in communication with the product material inlet;
   (c) a product cavity in communication with the product material channel;
   (d) the product material channel defining a flow path for a product material to flow therein from the product material inlet to the product cavity;
   (e) a flow device assembly having a flow channel arranged along the product material channel such that the flow path extends through the flow channel;
   (f) a flow device actuation assembly which is operably connected to alter a posture of said flow channel with respect to the product material channel;
   whereby as product material flows in the flow path from the inlet to the product cavity, the flow device actuation assembly is operative to control pressure, volumetric, and/or mass flow rate conditions of the product material filling the product cavity.

2. A tooling assembly comprising:
   (a) a product: material inlet;
   (b) first and second product material channels in communication with the product material inlet;
   (c) first and second product cavities in communication with the first and second product material channels, respectively;
   (d) the first and second product material channels defining a pair of flow paths for a product material to flow therein from the product material inlet to respective ones of the first and second product cavities;
   (e) a pair of flow device assemblies each comprising a flow channel arranged along a respective one of the first and second product material channels such that each of the flow paths extends through a respective one of the flow channels;
   (f) a pair of flow device actuation assemblies each of which is operably connected to alter a posture of a respective said flow channel with respect to its respective said product material channel;
   whereby as product material flows in the flow path from the inlet to the first and second product cavities, the pair of flow device actuation assemblies are operative to control pressure, volumetric, and/or mass flow rate conditions of the product material filling the first and second product cavities.

3. A process for making a part comprising a solidifiable product material, comprising:
   (a) flowing the product material in a flow path;
   (b) providing a flow channel comprising a portion of the flow path, the flow channel being adjacent to other portions of the flow path;
   (c) altering a posture of the flow channel with respect to the adjacent portions of the flow path so that said flow channel is offset from said adjacent portions of the flow path; and
   (d) allowing said product material to solidify in said offset flow channel and said adjacent portions of the flow path whereby said part is formed with an impression of said offset flow channel and said adjacent portions of said flow path;
   whereby said solidified material in said offset flow channel is offset with respect to said solidified material in said adjacent portions of the flow path.

4. The tooling assembly according to claim 1, wherein said flow device actuation assembly is rotatable to alter an angle of said flow channel with respect to said product material channel.

* * * * *